Figure 1:
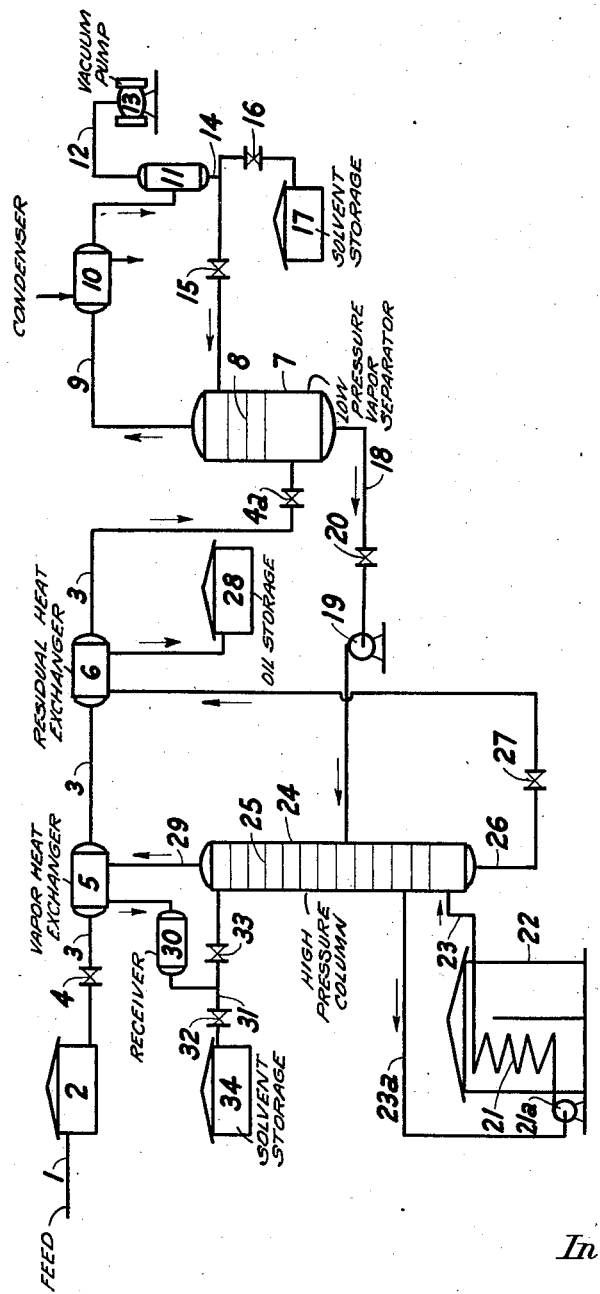

Inventors
WILLIAM H. SHIFFLER
JOHN Q. COPE by ........................
Attorney

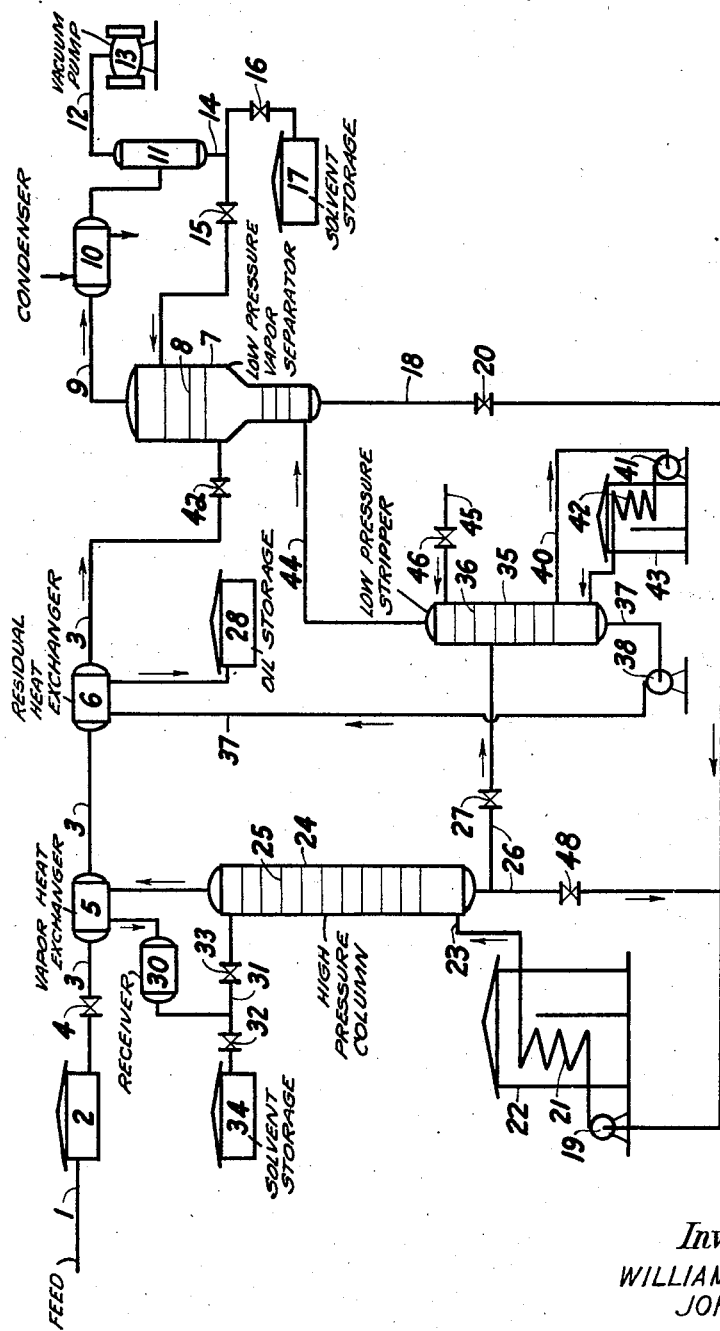

Patented Apr. 26, 1938

2,115,401

UNITED STATES PATENT OFFICE 2,115,401

METHOD OF DISTILLATION

William H. Shiffler and John Q. Cope, Berkeley, Calif., assignors to Standard Oil Company of California, San Francisco, Calif., a corporation of Delaware Application June 26, 1935, Serial No. 28,518

6 Claims. (Cl. 202—61)

This invention relates to a method and apparatus for separating mixed liquids, the components of which differ considerably as to boiling point.

An example of a mixed liquid which this invention is especially adapted to separate occurs when an oil is treated or contacted with a selective solvent. Two layers are formed, one of which consists largely of oil in which some of the solvent is dissolved and the other largely of solvent in which some of the oil is dissolved. The oil in the former layer is generally known as raffinate, while the oil in the latter layer is generally known as extract. Numerous selective solvents are known of and used in the industry which form layers of this sort. Examples are liquid sulfur dioxide, phenol, cresol, furfural, aniline, etc. It is customary to separate the solvent from high boiling raffinates and extracts by simple evaporation in the case of sulfur dioxide, and by fractionation in the case of the higher boiling solvents such as phenol, etc.

It is the object of this invention to provide an improved method of and apparatus for carrying out this fractional distillation, and effecting such separation in a more efficient manner than has hitherto been used.

Although not limited in its usefulness thereto, the present invention is particularly suitable for recovering such relatively high-boiling solvents as cresol, phenol and aniline from hydrocarbon oils in which they are dissolved.

In order that the principle of the operation of the invention may be more readily understood, reference is made to its embodiment in two forms of apparatus shown diagrammatically in Figures 1 and 2, and to the following description of typical operations carried out therein. These drawings and descriptions are illustrative only. Various modifications and substitutions may be made in the equipment and operation set forth without departing from the spirit of the invention, as will be apparent from the discussion which follows:

Referring to the drawings, Figure 1, the numeral 1 represents a pipe line leading from a treating plant, not shown, in which a petroleum oil is treated with phenol in order to remove undesirable constituents. The extract layer, containing the greater proportion of the phenol and the undesired constituents of the oil, flows through pipe 1 into a storage tank or surge drum 2. From the surge drum 2 the extract containing solvent enters the recovery plant through pipe 3 controlled by a valve located at 4 or 4a as desired. Pipe 3 is connected to two heat exchangers 5 and 6, as shown. After passing the heat exchangers which may be either in series as shown, or in parallel, the oil flows through an extension of pipe 3 and enters the flash chamber 7. The chamber 7 may be extended as shown to form a vertical column which may be equipped with suitable means for baffling and contacting liquids and vapors, such as the bubble cap plates 8. A vapor line 9 leads from the top of the column 7 through a suitable condenser 10, thence to a receiver 11. To the top of the receiver 11 there is connected a gas line 12 leading to a compressor 13 whereby a reduced pressure may be maintained on column 7 and on the material flowing through line 3. The condensate collected in receiver 11 is withdrawn through a branched pipe 14 equipped with control valves 15 and 16 whereby, if desired, a portion of the condensate may be returned, to the column 7 to serve as reflux for the condensation of oil vapors, and their return to the lower section of the column, and the remainder of the condensate may be run to a storage tank 17.

From the bottom of the column 7 a conduit leads to a valve 20 and pump 19 which discharges through an extension of conduit 18, to the side of a fractionating column 24 equipped with bubble-cap plates 25, or equivalent construction as is well known for such use. The bottoms from the column 24 flow through pipe 26 and valve 27 to and through heat exchanger 6 thence to storage tank 28. From the lower portion of the column 24 a conduit 23a leads to a pump 21a and a heater coil 21 mounted in a suitable furnace 22. The outlet of the coil 21 is connected with a transfer line 23 leading to the lower portion of column 24. The vapors from the top of column 24 flow through pipe 29 which leads to and through heat exchanger 5, thence to receiver 30. The condensate from receiver 30 passes through branched line 31 equipped with valves 32 and 33 whereby a part of the condensate may be returned to the column 24 to serve as reflux material and the remainder may be passed to storage tank 34.

An example of an operation carried out in apparatus indicated diagrammatically in Figure 1 is as follows:

The extract containing a large amount of solvent, i. e., in this example phenol, flows from the storage tank 2 through exchangers 5 and 6, wherein it is subjected to sub-atmospheric pressure and is heated by indirect contact with condensing phenol vapors entering from line 29 and with hot oil entering from line 26, thereby having its temperature raised to about 200° F., and a considerable portion of its phenol content vaporized. The heated material from line 3 discharges into column 7 wherein a sub-atmospheric pressure is maintained. In the event that some water has been used in solution with the phenol for treating, a part or all of the water content of the extract layer will also vaporize in column 7. The vapors from column 7 pass through vapor line 9 and are condensed in condenser 10. The condensate, collecting in receiver 11, is divided by manipulation of valves 15 and 16 so that a predetermined portion is returned to column 7 for refluxing, and the balance is collected in storage tank 17. The temperature, pressure and reflux rate in column 7 are so regulated that no appreciable quantity of oil vapor is present in line 9 and only phenol (and water, if any is present in the system) will be obtained in tank 17.

That portion of the extract layer which is unvaporized in column 7 flows from the bottom thereof through pipe 18 to pump 19 from which it is discharged at a higher pressure (e. g., atmospheric) to the side of column 24. The liquid flowing through line 18 consists of extracted portions of the oil and a substantial proportion of phenol. Unvaporized liquid collecting in the lower part of the column 24 is withdrawn through pipe 23a, by pump 21a and forced through heater 21 back into the column through line 23, thereby boiling the liquid in the heater and delivering a mixture of liquid and vapor to the base of column 24. In this column, which is refluxed at the top and heated at the bottom, an efficient fractionation is carried out between phenol, which passes overhead through vapor line 29 and extracted oil which is withdrawn from the bottom through line 26. This extracted oil is cooled in exchanger 6, where it is used to preheat the feed coming to the plant, and thence flows to extracted oil storage tank 28. Additional cooling means may be installed between exchanger 6 and tank 28, if desired. The phenol vapors from column 24 are totally condensed in exchanger 5 and the condensate collected in receiver 30. A predetermined proportion of this condensate is returned to column 24 to serve as reflux material by suitable manipulation of valves 32 and 33. The balance is run to storage tank 34.

If anhydrous phenol has been used in the treating plant, and there is consequently no significant amount of water in the extract layer, one recovered phenol storage tank may take the place of tanks 34 and 17. In those cases where water is present, the contents of the two tanks 34 and 17 may be blended in such a way as to give the phenol-water solution desired for treating.

A modification of the apparatus and operation above described is illustrated by Figure 2. The plant illustrated diagrammatically in Figure 2 includes essentially the same equipment illustrated in Figure 1, and in addition comprises what may be termed a third stage. This third stage offers a means of attaining greater efficiency and flexibility when high boiling oils are processed, or when, for any reason, the temperature of the liquid at the bottom of the column 24 must be kept below the initial boiling point of the oil being processed. The corresponding numerals used in Figure 2 refer to the same parts having the same functions as already described in connection with Figure 1 and need not be repeated in detail. The extract layer flows from storage tank 2 to column 7, as in Figure 1. The bottom of column 7 is connected, in this case, through valve 20 and pump 19 with a heater coil 21 located in a furnace 22. Line 23 connects the outlet from the heater to the lower portion of column 24. The unvaporized oil from column 24, in this case containing a small percentage of phenol, flows through line 26 which (in the case of Figure 2) is connected to the side of a column 35 operated at a pressure lower than that in column 24. This column 35 may be advantageously equipped with baffle plates 36 or the equivalent. The vapor line 44 from the top of column 35 may be connected to a condenser not shown, but is preferably connected directly to the lower part of the lower pressure column 7, thus resulting in a lower pressure in the column 35. The lower part of column 35 is equipped with heating means, that shown being a fired external heater and circulating line, i. e., line 40, pump 41 and heater coil 42 mounted in a furnace 43. Unvaporized residue from the bottom of column 35 is drawn through line 37 and is forced by a pump 38 through a control valve 39 and thence to the heat exchanger 6. From the exchanger 6 the cooled residue flows to extracted oil storage tank 28. Provision is made for the introduction of a refluxing material into the upper portion of the tower 35 through line 45, controlled by valve 46.

The line 26, described as connecting the bottom of column 24 with column 35, is connected with a branch line 47 containing a valve 48, and connecting with line 18 leading to the heater 21. By this means part of the bottoms from column 24 may be circulated through heater 21 to provide additional heat absorbing medium.

An example of operation with a lubricating oil extract from a phenol refining operation, in accordance with the apparatus shown in Figure 2 is as follows:

The extract layer from tank 2 flows through exchangers 5 and 6 where it is heated to about 200° F., and is then introduced into low pressure column 7, thereby vaporizing a large part of the phenol which is separated and collected in tank 17—all as previously described in connection with the operation according to Figure 1. The bottoms from the column 7 are pumped by a pump 19 through line 18 and heater 21, where the temperature is raised to about 500° F., and thence into the atmospheric column 24 wherein additional phenol is removed by fractional distillation and collected in tank 34 as described in connection with Figure 1. Refluxing at the top of column 24 is carried out by the return of the necessary amount of condensate through line 31 and valve 33 so as to prevent the passage of oil fractions with the phenol vapors through vapor line 29.

In operating according to this example, traces of phenol will remain in the bottoms from the tower 24, due to having used a boiling temperature of 500° F., instead of operating the heater at the higher boiling point of phenol-free oil, which would have promoted decomposition reactions. In such cases it is desirable to strip the bottoms before they are allowed to flow to tank 28. This is done in this case by connecting the bottom line 26 to the side of a stripper column 35 which is maintained under reduced pressure. The bottoms which enter the column 35 through line 26 at about 500° F., flow over suitable baffles to the bottom of the column. Liquid reaching the bottom of the column 35 is withdrawn by pump 41 through line 40 and pumped through heater 42 back into the column, thereby vaporizing part of the residue at its boiling point, for example, about 600° F. at reduced pressure. Reflux liquid comprising phenol, or preferably extract from tank 2 or from line 18, is admitted at the top of column 35 to condense and return oil vapors to the column, thereby permitting vigorous reboiling in the heater 42. This insures that the stock withdrawn through line 37 is phenol-free. Phenol vapors from the column 35 may be condensed in a separate condenser, not shown. It is preferable, however, to deliver them through line 44 to column 7, thereby utilizing the compressor 13 for maintaining the desired reduced pressure in column 35 and permitting the discharge of some oil vapors to line 44 along with the phenol vapors, if desired.

The actual pressures used in the two stages, represented by columns 7 and 24, are chosen in accordance with the characteristics of the components of the liquid (tank 2) being separated as well as with the performance desired in each stage, as will be apparent to those skilled in the art. The essential feature of our invention, in this respect, is that the pressure on 7, whether it be above or below atmospheric, shall be lower than that on 24, thus making it possible to boil the charge to 7 by heat abstracted from the vapors from 24.

It is preferable, but not essential, that the pressure on the feed in exchangers 5 and 6, should be lower than that on column 24. A pressure on the feed side of exchangers 5 and 6 qual to or higher than that on 24, such as might be caused, for example, by throttling at valve 4a in line 3 between the exchangers and column 7, will not prevent the functioning of the process, i. e., boiling of the charge to 7 by heat abstracted in the exchangers, provided the pressure on column 7 is maintained lower than that on column 24. It is preferable, however, to avoid such pressures since in general, the efficiency of the exchangers is thereby reduced by a lower heat absorbing capacity and the higher temperatures encountered on the feed side.

The bottoms from 24 (or from 35 in Fig. 2) are preferably used to heat incoming feed (as shown in exchanger 6), but may be cooled independently of the feed without affecting the functional relations between heat exchanger 5 and columns 7 and 24. Reflux may be used in columns 7 and 35 as desired. In the case of Figure 2, the pressure on stripper 35 is, as stated, lower than that on the fractionating system (column 24, etc.), but moderately higher than that on the first stage (represented by column 7) in order that vapor may flow (through line 44) from column 35 to column 7. It should also be noted that, although the pressure on the feed side or exchanger 5 should preferably be lower than that on the vapor side, the pressure on the feed side will not be as low as that on the column 7, due to line loss, etc.

It is obvious that the temperatures cited in the foregoing examples are those suited to a particular case, and may be varied without departing from the spirit of the invention. It is necessary, of course, that the temperature in the bottom of column 24 be higher than that in column 7, but the temperature in the bottom of column 35 may be higher or lower than that in column 24, depending on the pressure used in column 35 and the initial boiling point of the oil being processed.

While the invention has thus far been described as applied to the separation of a selective oil solvent from the extracted constituents of the oil which it has dissolved, it may be applied with equal advantage to the separation of other solvents. An outstanding example is the case, frequently met in the industry, where a relatively viscous oil is blended with a relatively non-viscous "cutter" or diluent, for one purpose or another, and it is subsequently necessary to separate the diluent from the solution. Such blends are sometimes made to facilitate acid or other chemical treatment, for ease of handling, etc. A common example is in the dewaxing of petroleum lubricating oil stock. Most of the dewaxing processes in commercial use at present employ some kind of low specific gravity, low-viscosity diluent ("solvent" or "anti-solvent") which it is necessary to remove from the oil after wax separation. The present invention may be employed with great advantage to effect separations of this kind. If low boiling petroleum naphtha has been used as a dewaxing diluent, approximately atmospheric pressure may be used on the first stage (column 7) and, consequently, super-atmospheric pressure on the fractionator (column 24). It may thus be necessary to impose "artificial" pressure on the last-named system, as by imposing extraneous gas pressure on the receiver 30.

Various changes in the apparatus described and illustrated in the drawings may be made without departing from the spirit of the invention, as will be obvious to those skilled in the art. For example, the heating circuits including coils 21 and 42 may be replaced by heating coils located within the respective columns.

We claim:

1. A process for separating and recovering a solvent from a solution containing a substantial proportion of said solvent and a mineral oil of higher boiling range than the solvent, comprising passing the solution through a heat exchange zone wherein it is heated sufficiently to vaporize a portion of said solvent at a predetermined pressure not in excess of the pressure maintained on the solution in said heat exchange zone, vaporizing a portion of said solvent at said predetermined pressure, passing the remaining unvaporized solution into a distilling zone maintained at a substantially higher pressure than said predetermined pressure, heating the solution supplied to said distilling zone sufficiently to vaporize a further portion of said solvent and a portion of the mineral oil, fractionating vapors so formed in a fractionating zone, taking off vapors of said solvent from said fractionating zone, and condensing vapors issuing from said fractionating zone at a pressure substantially higher than said predetermined pressure by passing the same through the aforesaid heat exchange zone in indirect heat exchange relation with solution being fed to the system.

2. A process for separating and recovering a solvent from a solution containing a substantial proportion of said solvent and a mineral oil of higher boiling range than the solvent, comprising heating said solution by passing the same through a heat exchange zone in indirect contact with vapors of said solvent maintained under a higher pressure than the solution to effect vaporization of a portion of its solvent content, separating solvent vapors from the solution at a pressure not in excess of that maintained on the solution in said heat exchange zone, passing the remaining portion of the solution to a distilling zone maintained at a pressure higher than the pressure on the solution in said heat exchange zone and heating the solution therein sufficiently to vaporize further portions of the solvent content of said solution and a part of the oil content thereof, fractionating the resulting vapors in a fractionating zone, passing solvent vapors from said fractionating zone to said heat exchange zone, and condensing solvent vapors therein by said indirect contact with solution being fed to the system.

3. A process for separating and recovering a solvent from a solution containing a substantial proportion of said solvent and a mineral oil of higher boiling range than the solvent, comprising passing the solution through a heat exchange zone wherein it is heated, by indirect heat exchange with condensing vapors of said solvent, sufficiently to vaporize a portion of said solvent at a predetermined pressure lower than the pressure on the said solvent vapors, vaporizing a portion of said solvent at said predetermined pressure, separating and removing the vapors so formed, passing the remaining unvaporized solution into a distilling zone at a substantially higher pressure than said predetermined pressure, heating the solution in said distilling zone to vaporize a further portion of said solvent and a portion of the mineral oil, fractionating vapors so formed in a fractionating zone, taking off vapors of said solvent from said zone, and condensing said vapors in the aforesaid heat exchange zone under a pressure substantially greater than said predetermined pressure.

4. A process for separating a solvent from a solution containing a substantial proportion of said solvent and a mineral oil of higher boiling range than the solvent, comprising passing the solution through two successive vaporizing zones maintained under successively higher pressures, effecting in the first zone vaporization of a part of the solvent content of the solution, separating and removing such vapors, vaporizing in the second vaporizing zone a further portion of the solvent content of said solution having approximately the same boiling range as the portion of said solvent vaporized in said first zone and a portion of the mineral oil, subjecting the vapors so formed to fractionation in a fractionating zone, and condensing vapors issuing from said fractionation zone under a pressure substantially higher than the pressure in said first zone by passing the same in indirect heat exchange relation with solution supplied to said first zone and thereby causing vaporization of solvent in said first zone.

5. A process for separating and recovering a solvent from a solution containing a substantial proportion of said solvent and a higher boiling mineral oil, comprising passing the solution through a heat exchange zone, vaporizing at relatively low pressure a portion of the solvent by heat imparted thereto in said heat exchange zone, separating and removing from the solution such vaporized portion, passing the remaining unvaporized solution into a distilling zone maintained at a substantially higher pressure than that under which said portion of the solvent was vaporized, heating the solution supplied to said distilling zone to a temperature sufficient to vaporize a further portion of the solvent content thereof and a portion of the mineral oil, subjecting the vapors so formed to fractionation in a fractionating zone, condensing vapors of said solvent from said fractionating zone at substantially said higher pressure by passing the same through the aforesaid heat exchange zone in indirect heat exchange relation with the solution fed to the system, and returning a portion of such condensate to said fractionating zone as reflux medium.

6. A process for separating a solvent from a solution containing a substantial proportion of said solvent and a mineral oil of higher boiling range than the solvent, comprising passing the solution through three successive vaporizing zones, maintaining a higher pressure on the intermediate vaporizing zone than on the initial and final vaporizing zones, effecting in the first zone vaporization of a part of the solvent content of the solution, separating and removing such vapors, vaporizing in the second vaporizing zone a further portion of the solvent content of said solution having approximately the same boiling range as the portion of said solvent vaporized in said first zone and a portion of the mineral oil, subjecting the vapors so formed to fractionation in a fractionating zone, passing vapors from said fractionating zone in indirect heat exchange relation with the solution being fed to the system, maintaining a pressure ratio between the vapor side and the feed side of said heat exchange zone such that solvent vapors evolved in said intermediate higher pressure zone are condensed therein and the solution fed thereto is heated sufficiently to vaporize a portion of the solvent content thereof in said first zone, and effecting a final separation of solvent vapors from oil in the third and final vaporizing zone.

WILLIAM H. SHIFFLER.
JOHN Q. COPE.